UNITED STATES PATENT OFFICE.

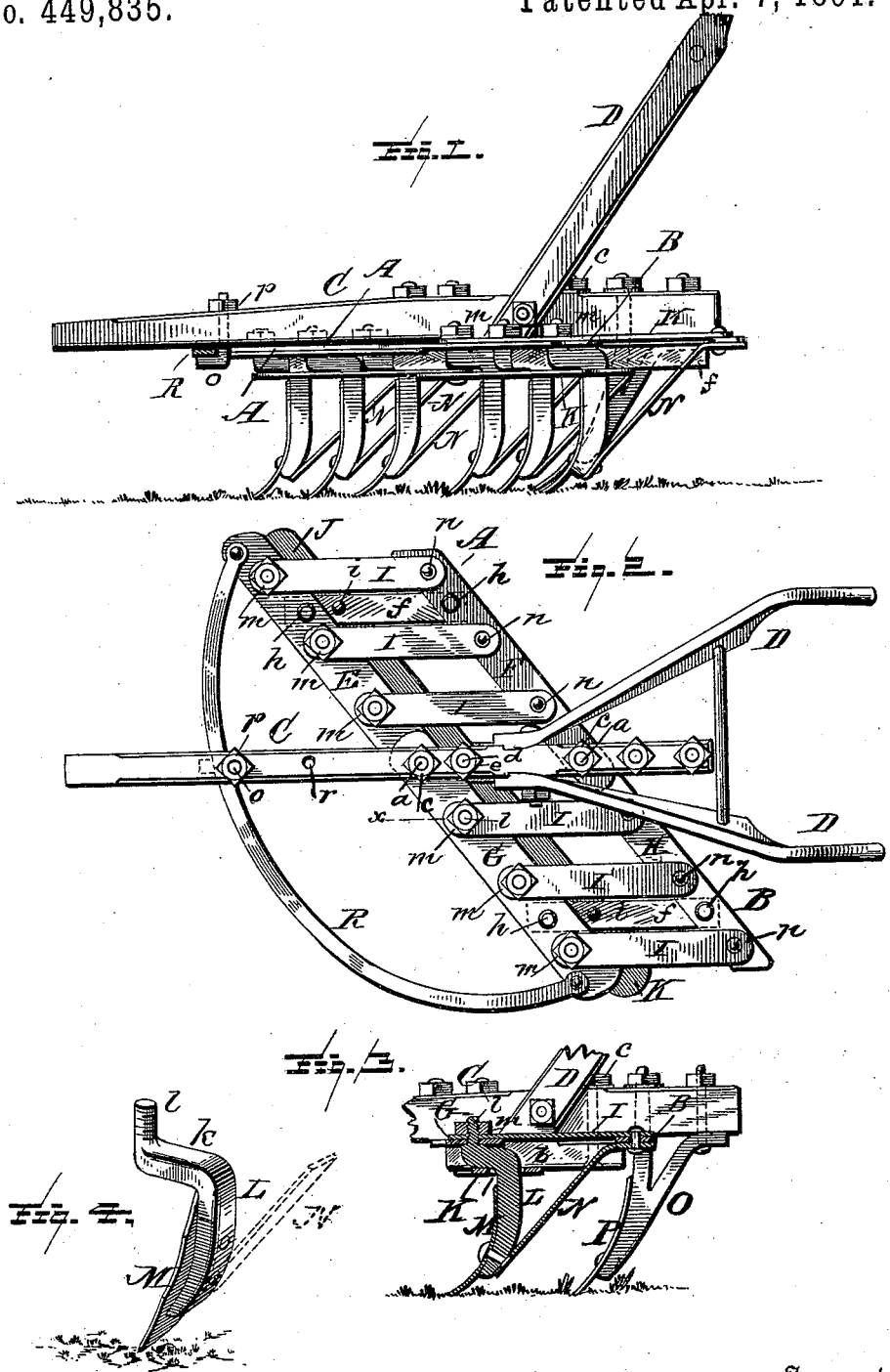

JOLLY C. THOMPSON AND SAMUEL A. PARKER, OF JERSEY, ARKANSAS.

SIDE HARROW OR CULTIVATOR.

SPECIFICATION forming part of Letters Patent No. 449,835, dated April 7, 1891.

Application filed November 1, 1890. Serial No. 370,029. (No model.)

*To all whom it may concern:*

Be it known that we, JOLLY C. THOMPSON and SAMUEL A. PARKER, citizens of the United States, residing at Jersey, in the county of Bradley and State of Arkansas, have invented certain new and useful Improvements in Side Harrows or Cultivators; and we do hereby declare that the following is a full, clear, and exact description of the same, reference being had to the annexed drawings, making a part of this specification, and to the letters of reference marked thereon.

Figure 1 of the drawings represents a side elevation of our improved harrow and cultivator; Fig. 2, a top plan view thereof; Fig. 3, a detail sectional view taken on line $x$ of Fig. 2; Fig. 4, a detail view, in perspective, of one of the shovels and its connection.

The present invention has for its object to provide an agricultural machine that is capable of use as a harrow or cultivator, that is readily convertible into a side harrow or forked harrow or cultivator, as circumstances require, and will effectually do its work in whatever position the machine is adjusted, either for the purpose of preparing the soil before planting or the cultivation of the crop of corn or cotton, rendering the machine valuable for its many uses, and especially so in the ease with which it is convertible from one device to another to adapt it for immediate use as necessity demands. These several objects we attain by the construction substantially as shown in the drawings, and hereinafter described.

The machine consists of two pivoted sections or wings A B, which carry the teeth or shovels, said sections or wings being pivoted at their inner ends to a central beam C, to which are connected the handles D, of the usual construction. These sections or wings, which are constructed substantially alike, consist of two parallel bars, the parallel bars E F composing one of said sections and the parallel bars G H the other section. The two sections or wings, as above described, are pivoted together at their inner ends by pivot-bolts $a$, which extend through the beam C and through the inner ends of the parallel bars and through a brace-block $b$, located upon the under side of said bars, thereby holding the pivoted ends of the bars firmly between the beam and block. The pivot-bolts $a$ have screw-threaded ends, which extend up beyond the upper side of the beam C, and with which engage suitable nuts $c$. The parallel bars which compose the sections or wings A B are connected together by links I, pivoted to said bars, and which form braces therefor, but admit of the sections or wings being adjusted to any angle with the line of draft. Under the sections or wings A B and forward of the bars F H are bars J K, the inner ends thereof being pivoted to the under side of the brace-block $b$ by means of the pivot-bolt $d$ and nut $e$, said bolt extending through the ends of the bars and through the block and beam.

Near the outer ends of the bars composing the sections or wings A B are brace-blocks $f$, to which the bars are pivoted at $h$ in any suitable manner, and to the under side of these brace-blocks are also pivoted the bars J K in any convenient manner, as shown at $i$. The standards L, to which the teeth or shovels M are connected, have a right-angle extension $k$ and an upwardly-extending screw-shank $l$ to receive nut $m$. These standards, with their teeth or shovels, may be of any number desired, and have angular braces N, suitably attached at their lower ends to the rear side of the standards and their upper ends pivoted to the rear bars F H by the same pivots as connect the rear ends of the links I to said bars, as shown at $n$. The standards L pass up through suitable openings in the bars J K, and the screw-shanks $l$ extend up through holes in the bars E G, and the standards are held to said bars by the nuts $m$ engaging with the shanks above the bars, through which they extend. The right-angle extensions $k$ of the standards form a support for the bars E G and admit of their turning on the shank to enable the sections or wings A B to be adjusted with relation to each other, the openings in the lower bars J K admitting of their being adjusted simultaneously with the bars above them. To the rear end of the beam C is connected in any suitable manner that will admit of its ready removal a standard O, with tooth or shovel P. To the outer extremities of the bars E G are pivotally connected the ends of a curved brace R, which is adjustably held to the beam C by means of the clamping-bolt $o$ and nut $p$, said bolt passing through one of a series of holes $r$ in the beam.

In changing the angle of the sections or wings A B to adapt the machine to the use to which it is to be applied nut $p$ is unscrewed and the clamp-bolt $o$ removed. The sections or wings A B can be brought to an acute angle to each other by simply moving them on their pivotal connections at their inner ends in the required direction, which will form a V-shaped harrow, and the sections or wings are retained and held in their adjusted position by replacing the clamp-bolt in rear of one of the holes $r$ and engaging the nut with the screw-threaded end thereof to hold the brace R firmly to the beam C at that point. It should be understood that when the sections or wings are thus adjusted the curved brace will come back on line with the rear hole in the beam, so that it can be held thereto by the clamp-bolt, the curved brace securely holding the sections or wings in the position in which they are adjusted.

The manner of pivotally connecting the several bars constituting the sections or wings A B and the links I, pivoted thereto, as well as the manner of connecting the standards L to the bars and links, admit of the sections or wings being readily and easily adjusted.

By removing the standard O, with its tooth or shovel P, at the rear end of the beam C, and suitably adjusting the sections or wings A B a harrow is provided that can be used on both sides of a row at one and the same time.

The sections or wings can be adjusted so that they will be at right angles to the beam or line of draft, or at the angle shown in the drawings, whereby a cultivator or harrow is provided that can be used for pulverizing or leveling the soil.

The drawings show the sections or wings adjusted to a left-hand cultivator, and when required for use as a right-hand cultivator the sections or wings have their angles reversed.

The sections or wings A B can be changed from one position to another to suit the uses to which it may be desired to put it, this being done, as previously stated, by removing the clamp bolt and nut and replacing it in the proper hole in the beam to hold the curved brace to the beam in its adjusted position, said brace serving to firmly hold the sections or wings to the angle to which they are adjusted.

The construction above described will admit of the machine being used for various purposes, and is so easy of adjustment that it will require but little trouble on the part of the attendant to put it in condition to be successfully used for the various purposes hereinbefore described, while it possesses both strength and durability.

Having now fully described our invention, what we claim as new, and desire to secure by Letters Patent, is—

The pivoted bars E F and G H, connected together by links I, in combination with the lower bars J K, brace-blocks $b\ f$, to which the several bars are pivoted, and the standards L, carrying the teeth or shovels, said standards having right-angle extensions $k$ and upwardly-extending screw-shanks $l$, substantially as and for the purpose set forth.

In testimony that we claim the above we have hereunto subscribed our names in the presence of two witnesses.

JOLLY C. THOMPSON.
SAMUEL A. PARKER.

Witnesses:
H. B. VAN VALKENBURGH,
H. E. BOND.